United States Patent
Meano, Sr.

(10) Patent No.: US 9,776,136 B2
(45) Date of Patent: Oct. 3, 2017

(54) SYSTEM AND METHOD FOR PURIFYING WATER FROM A BODY OF WATER

(71) Applicant: Brian K. Meano, Sr., Cleveland, OK (US)

(72) Inventor: Brian K. Meano, Sr., Cleveland, OK (US)

( * ) Notice: Subject to any disclaimer, the term of this patent is extended or adjusted under 35 U.S.C. 154(b) by 294 days.

(21) Appl. No.: 14/834,842

(22) Filed: Aug. 25, 2015

(65) Prior Publication Data
US 2016/0199783 A1 Jul. 14, 2016

Related U.S. Application Data

(60) Provisional application No. 62/102,445, filed on Jan. 12, 2015.

(51) Int. Cl.
| | |
|---|---|
| *B01D 61/02* | (2006.01) |
| *C02F 1/44* | (2006.01) |
| *F03B 13/14* | (2006.01) |
| *B01D 61/10* | (2006.01) |
| *C02F 103/00* | (2006.01) |
| *C02F 103/08* | (2006.01) |

(52) U.S. Cl.
CPC ........... *B01D 61/027* (2013.01); *B01D 61/10* (2013.01); *C02F 1/441* (2013.01); *C02F 1/442* (2013.01); *F03B 13/145* (2013.01); *C02F 2103/007* (2013.01); *C02F 2103/08* (2013.01); *C02F 2201/008* (2013.01); *C02F 2303/10* (2013.01); *C02F 2303/24* (2013.01); *Y02W 10/30* (2015.05)

(58) Field of Classification Search
CPC ....... B01D 61/027; B01D 61/10; C02F 1/441; C02F 1/442; C02F 2103/007; C02F 2103/08; C02F 2201/008; C02F 2303/10; C02F 2303/24; F03B 13/145

See application file for complete search history.

(56) References Cited

U.S. PATENT DOCUMENTS

| | | | | |
|---|---|---|---|---|
| 4,141,670 | A * | 2/1979 | Russell | F03B 13/145 290/53 |
| 4,565,627 | A * | 1/1986 | Lagstrom | E02B 9/08 210/242.1 |
| 6,083,382 | A * | 7/2000 | Bird | B01D 61/06 210/143 |
| 7,081,205 | B2 * | 7/2006 | Gordon | B01D 61/025 203/10 |
| 2012/0174999 | A1 * | 7/2012 | Lieberman | B01D 61/10 137/565.01 |

* cited by examiner

*Primary Examiner* — Terry Cecil
(74) *Attorney, Agent, or Firm* — Plager Schack LLP

(57) ABSTRACT

Some embodiments of the present disclosure include a water purification system for producing purified water from a body of water. The water purification system may include a floating platform having a ramp extending from an edge thereof at a downward angle into the body of water, a primary impoundment area extending from a top portion of the ramp onto the floating platform, a pair of sub-impoundment areas attached to an end of the primary impoundment area distal from the ramp, at least one hydraulic cylinder and at least one accumulator attached to the sub-impoundment areas, and a nanofiltration system operatively attached to the at least one hydraulic accumulator. Water may be configured to flow from the body of water onto the ramp and through the system, exiting the nanofiltration system as purified water.

10 Claims, 5 Drawing Sheets

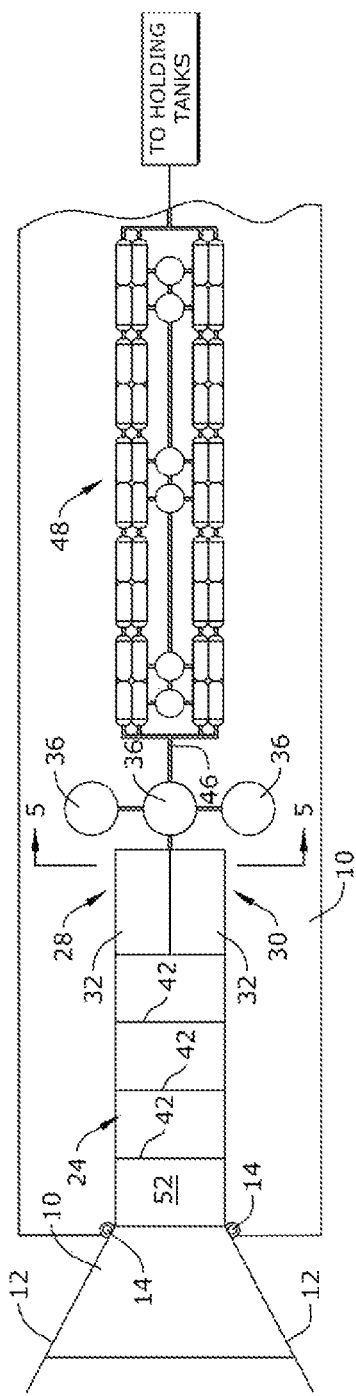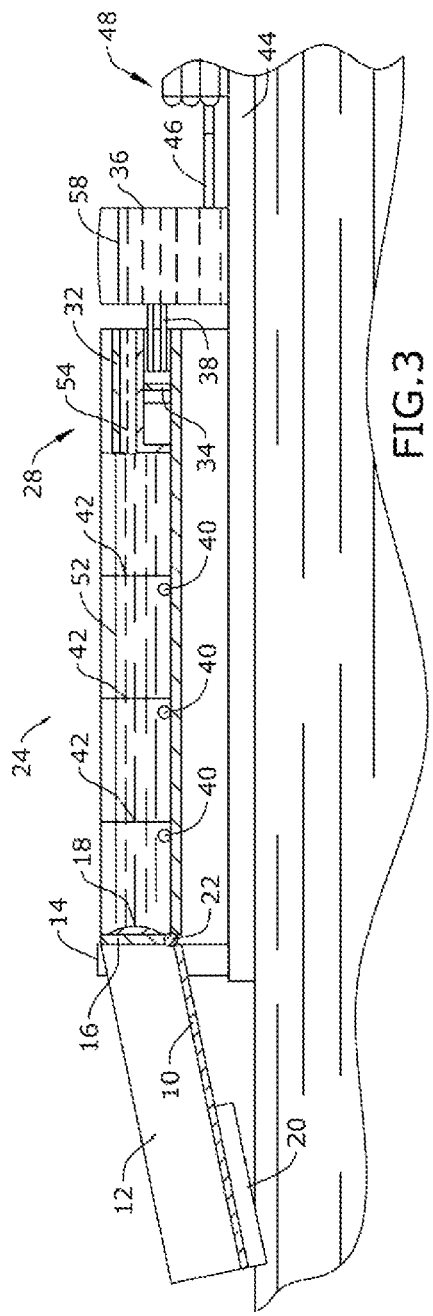

SYSTEM AND METHOD FOR PURIFYING WATER FROM A BODY OF WATER

RELATED APPLICATION

This application claims priority to provisional patent application U.S. Ser. No. 62/102,445 filed on Jan. 12, 2015, the entire contents of which is herein incorporated by reference.

BACKGROUND

The embodiments herein relate generally to water purification, and more particularly, to a method for purifying water from a body of water, such as an ocean or an inland river.

Conventional water purification systems have erratic delivery of pressurized fluid to the filter and result in low volume production. Additionally, conventional systems are run off of fuel, which has a high cost and which creates pollution.

Therefore, what is needed is a system to purify water from bodies of water that provides for a high volume and a steady delivery of pressurized fluid to a filter, wherein the system does not require fuel.

SUMMARY

Some embodiments of the present disclosure include a water purification system for producing purified water from a body of water. The water purification system may include a floating platform having a ramp extending from an edge thereof at a downward angle into the body of water, a primary impoundment area extending from a top portion of the ramp onto the floating platform, at least one sub-impoundment area attached to an end of the primary impoundment area distal from the ramp, at least one hydraulic accumulator attached to the sub-impoundment areas, and a nanofiltration system operatively attached to the at least one hydraulic accumulator. Water may be configured to flow from the body of water onto the ramp and through the system, exiting the nanofiltration system as purified or potable water.

BRIEF DESCRIPTION OF THE FIGURES

The detailed description of some embodiments of the invention is made below with reference to the accompanying figures, wherein like numerals represent corresponding parts of the figures.

FIG. 2 is a schematic top view of one embodiment of the present disclosure.

FIG. 3 is a side perspective view of one embodiment of the present disclosure.

DETAILED DESCRIPTION OF CERTAIN EMBODIMENTS

Figure 1:
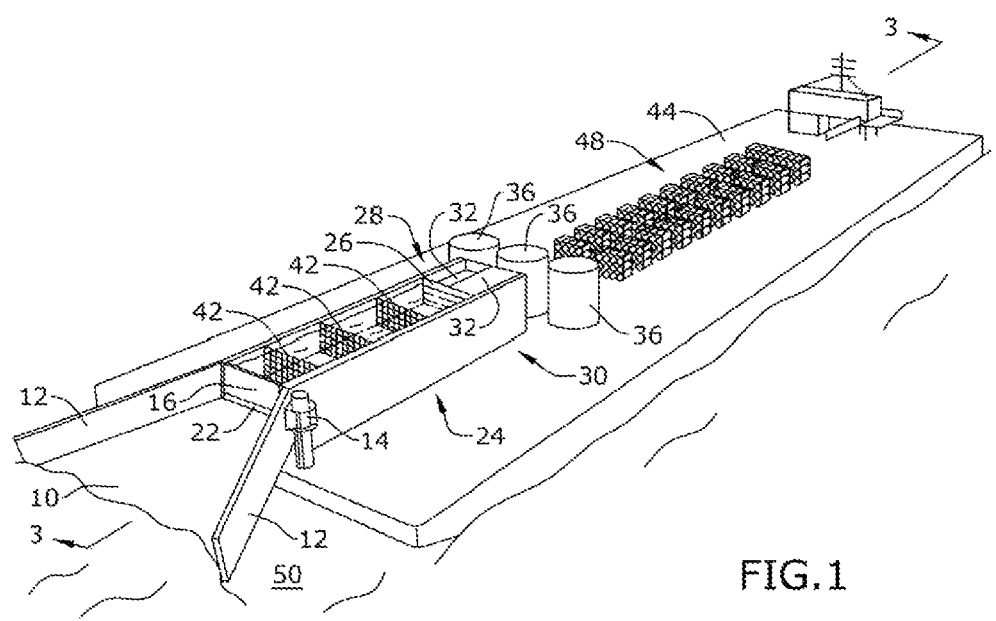
FIG. 1 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The method and system of the present disclosure may be used to purify water from a body of water and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Barge
2. Ramp
3. Primary Impoundment Area
4. Sub-Impoundment Areas
5. Ballast Tanks The various elements of the water purification system for purifying water from a body of water of the present disclosure may be related in the following exemplary fashion. It is not intended to limit the scope or nature of the relationships between the various elements and the following examples are presented as illustrative examples only.

By way of example, and referring to FIGS. 1-6, some embodiments of the water purification system of the present disclosure comprise a water purification system for purifying water from a body of water 50, the system comprising a platform or barge 44 having a ramp 10 extending from an edge thereof at a downward angle into the water 50, a primary impoundment area 24 extending from a top portion of the ramp 10 onto the barge 44, a pair of sub-impoundment areas 28, 30 attached to an end of the primary impoundment area 24 distal from the ramp 10, at least one hydraulic accumulator 36 attached to the sub-impoundment areas 28, 30, and a filtration system 48 operatively attached to the hydraulic accumulator 36, wherein the water 50 is configured to flow onto the ramp 10 and through the system to a holding tank, from which the water may be dispensed and used as desired. As shown in the Figures, the ramp 10 may include a pair of parabolic wave focusers 12 lining the edges thereof. The ramp 10 and the wave focusers 12 may work in tandem to elevate a wave in the water 50 to the highest level possible to maximize the recovery of kinetic energy contained in the wave driving it to a higher elevation on the barge 44. In some embodiments, the combination of the ramp 10 and the wave focusers 12 may double the wave height.

The ramp 10 may have at least one ballast tank 20 attached to a bottom surface thereof, wherein the ballast tank 20 may allow the pitch and the angle of the ramp 10 to be reconfigured to match the prevailing conditions in the water 50. A gate, such as an over-topping gate 16, may be positioned at a top portion of the ramp 10 distal from the water 50 to separate the ramp 10 from the primary impoundment area 24. The ramp 10 and the gate 16 may be connected to the barge 44 by a pair of guide rails 14, which may allow the ramp 10 and gate 16 to move up and down to conform to the prevailing conditions used to both maximize flow and elevation in the primary impoundment area 24. When water 50 comes up the ramp 10, it may crash into the over-topping gate 16 pushing it into primary impoundment area 24, wherein the gate 16 pivots open at gate hinge 22. The gate 16 may have at least one gate float 18 attached to a surface of the gate 16 facing inwardly towards the primary impoundment area 24, such that when water 50 flows into the primary impoundment area 24, the primary impound water 52 causes the gate float 18 to lift the gate 16 back up to the level of the water in the primary impoundment area 24, preventing the primary impound water 52 from escaping. Because of the structure of the ramp 10, gate 16, and primary impoundment area 24, the system may allow for additional water 50 to be added on a constant basis.

As shown in FIGS. 1-3, the primary impoundment area 24 may comprise a plurality of screens 42 and cleanout conduit openings 40, wherein the screens 42 may function to prevent aquatic life from entering the sub-impoundment areas 28, 30. The conduits 40 may be used for cleanout of the primary impoundment area 24 and/or for releasing aquatic life back into the body of water 50.

Figure 4:
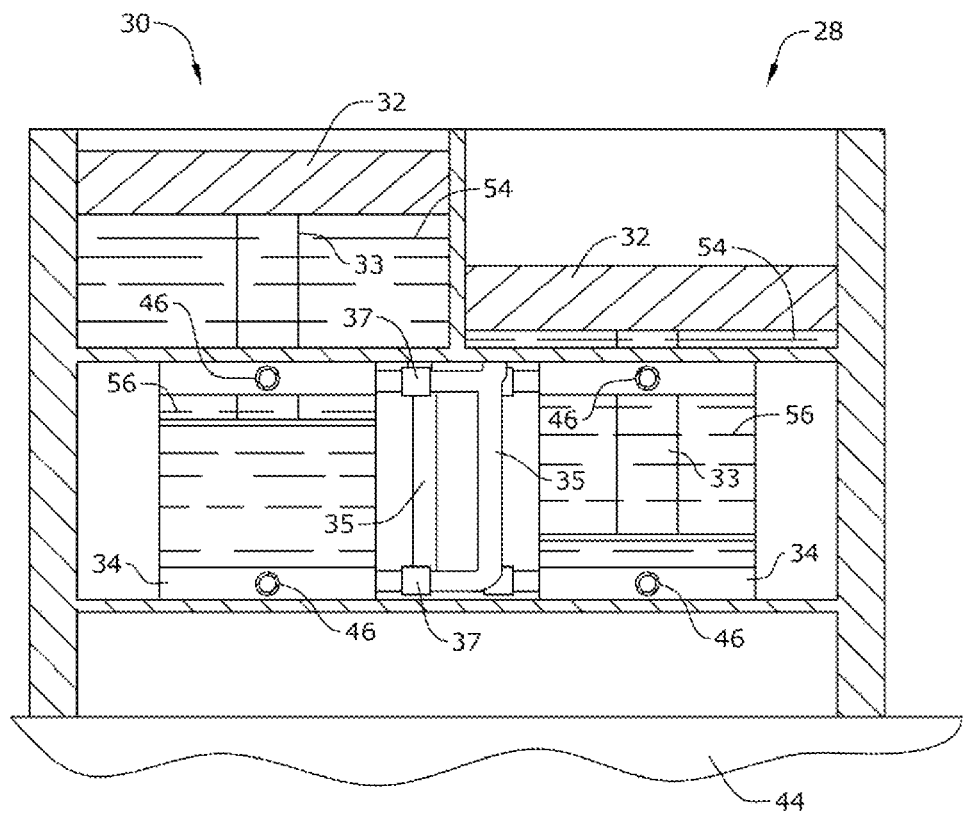
FIG. 4 is a section view of one embodiment of the present disclosure, taken along line 5-5 in FIG. 2.

The primary impound water 52 may flow into either the first sub-impound area 28 or the second sub-impound area 30. As shown in FIG. 4, each of the sub-impound areas 28, 30 may comprise a container with a buoyancy block 32 positioned therein, the container being configured to accommodate a volume of sub-impound water 54. Each buoyancy block 32 may be attached to a cylinder shaft 33 that extends downward into a hydraulic cylinder 34, wherein a cylinder feed pipe 35 may transport water from the container to the hydraulic cylinder 34. Thus, the hydraulic cylinders 34 may be, for example, closed-loop, double action, hydraulic cylinders 34. However, in other embodiments, the system may be an open system to accommodate the addition of more sea water to the system. Thus, in terms of the electrical portions, the system may be closed-loop, but on the water purification portions, the system may be an open system. In some embodiments, the system may include multiple hydraulic cylinders 34. Each of the cylinder feed pipes 35 may comprise at least one valve 37 to block the flow of water from the container to the hydraulic cylinder 34. Additionally, each hydraulic cylinder 34 may have a cylinder outlet feed pipe 38 extending therefrom, wherein the cylinder outlet feed pipe 38 may attach the hydraulic cylinder 34 to a hydraulic accumulator 36 and may permit cylinder water 56 to flow from the hydraulic cylinder 34 to the hydraulic accumulator 36.

In some embodiments, the primary impound water 52 may be directed into the sub-impound area 28, 30 by controlled and synchronized flow into the sub-impound area 28, 30 via a gate, such as a wicket gate 26, mounted at an end of the primary impoundment area 24 distal from the ramp 10. As the primary impound water 52 flows into the sub-impound area 28, 30, the primary impound water 52 may be referred to as sub-impound water 54, which may cause a positively buoyant block 32 configured to travel in a vertical path up and down to float. The displacement of the weighted buoyancy block 32 may be equal to or greater than the mass of the buoyancy block 32, which produces an equal force as the block 32 travels up and down, resulting in the creation of highly pressurized sub-impound water 54 on both the up and down strokes, increasing the efficiency of the system. The positively buoyant block 32 may be connected to the cylinder shaft 33, wherein the inflow and outward flow of the water provides a steady force inside the hydraulic cylinder 34. The water may then flow to the hydraulic accumulator 36, wherein the hydraulic accumulator 36 may be fitted with pressure regulator valves, such that the accumulator water 58 is maintained at a constant pressure, which may be important to the flow into the nanofiltration system 48.

Accumulator water 58 may flow from the hydraulic accumulator 36 through a feed pipe 46 into the nanofiltration system 48, wherein the nanofiltration system 48 may comprise, for example, a reverse osmosis nanofiltration system. The accumulator water 58 may run through the nanofiltration system 48 and exit the nanofiltration system 48 as purified water, which may be stored in holding tanks before being dispensed for use.

In embodiments, the system of the present disclosure may comprise additional components, such as sensors to monitor water levels and the opening and closing of gates and valves. Additionally, alternate versions of the system may not include the wave focuser 12, but rather may include a pair of straight parallel walls. The ramp 10 may also be replaced with a flat piece.

Because of the structure of the system, there may be an elimination in the variation of wave height of water, as opposed to conventional systems, which, in turn, provides for the elimination of a period of time for the leveling of water. Thus, the volume of clean water produced by the system of the present disclosure may be significantly greater than that produced from conventional systems. Moreover, no fuel may be necessary to run the system of the present disclosure, which eliminates pollution caused by fuel from conventional systems.

Figure 5:
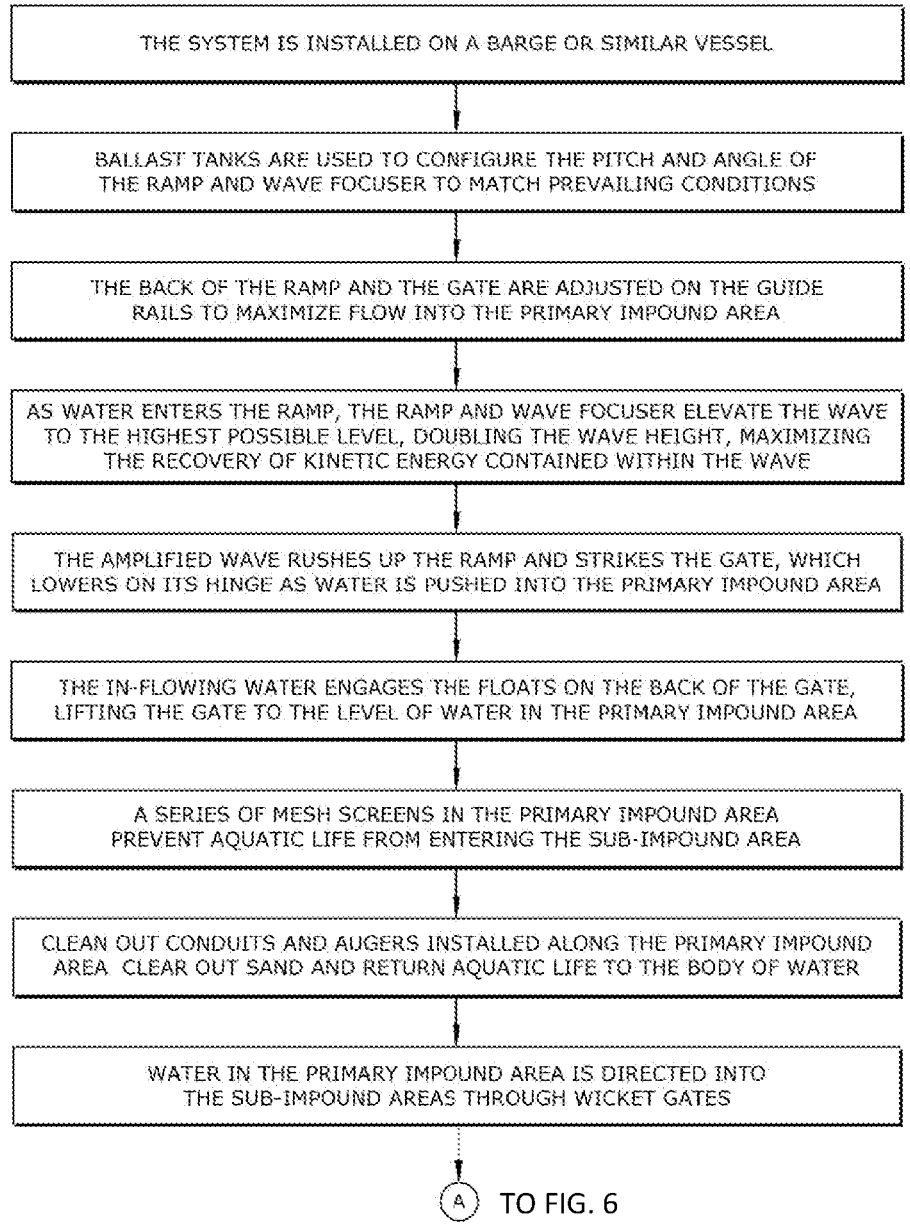
FIG. 5 is a flow chart of one embodiment of the present disclosure
Figure 6:
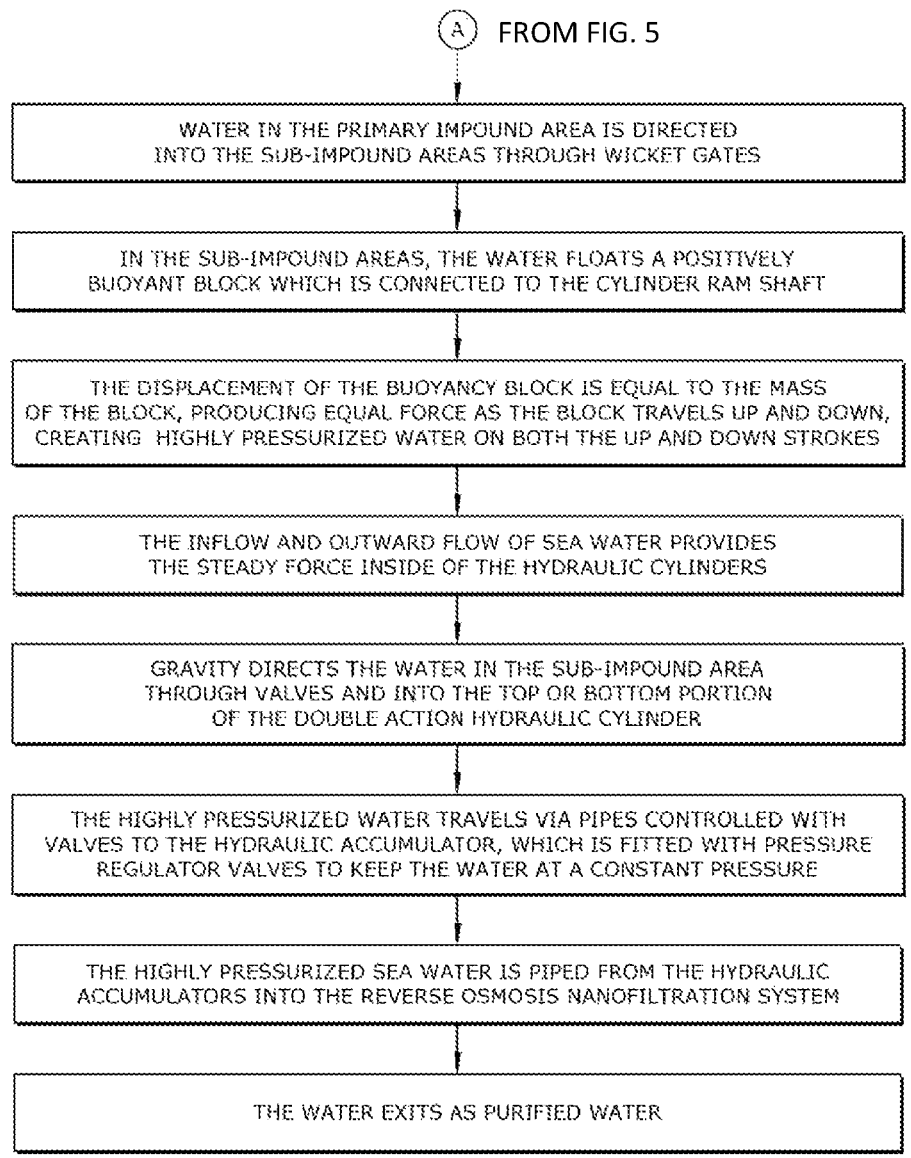
FIG. 6 is a continuation of FIG. 5.

As described in FIGS. 5 and 6, the system of the present disclosure may work as follows. The system may be installed on a barge 44 or similar vessel, wherein ballast tanks 20 may be used to configure the pitch and angle of the ramp 10 and wave focuser 12 to match prevailing conditions. The end of the ramp 10 distal from the body of water 50 may have a gate 16 mounted thereon, wherein the ramp 10 and the gate 16 may be adjusted on the guide rails 14 to maximize flow into the primary impound area 24. As water enters the ramp 10, the ramp 10 and wave focuser 12 may elevate the wave to the highest possible level, at least doubling the wave height and, thus, maximizing the recovery of kinetic energy contained within the wave. The amplified wave may rush up the ramp 10 and strike the gate 16, causing the gate 16 to lower on its hinge 22 as water is pushed into the primary impound area 24. The in-flowing water may engage the gate floats 18 on the gate 16, lifting the gate 16 to the level of the water in the primary impound area 24. A plurality of mesh screens may be spaced along a length of the primary impound area 24 to prevent aquatic life from entering the sub-impound areas 28, 30. Clean out conduits 40 and augers may also be installed along the length of the primary impound area 24 to clear out sand and other debris and return aquatic life to the body of water 50. Water in the primary impound area 24 may be directed into the sub-impound areas 28, 30 through a wicket gate 26. In the sub-impound areas 28, 30, the water may float a positively buoyant block 32, which may be connected to a cylinder ram shaft 33. The displacement of the buoyancy blocks 32 may create highly pressurized water, such as water at about 1000 to about 2000 psi, on both the up and down strokes, wherein the inflow and outward flow of sea water may provide a steady force inside of the hydraulic cylinders 34. Gravity may direct water from the sub-impound area 28, 30 through valves 37 and into the top or bottom portion of the double action hydraulic cylinder 34. The highly pressurized water may then travel via pipes controlled with valves to the hydraulic accumulator 36, which may be fitted with regulator valves to keep the water at a constant pressure. The water may be piped from the hydraulic accumulator 36 into a reverse osmosis nanofiltration system 48 from which the water exits as purified water. The reverse osmosis nanofiltration system 48 may comprise any conventional nanofiltration system configured to purify water.

While the system is described as producing filter water from water in an open body of water, the system may also have other functions. For example, the pressurized fluid contained in the hydraulic cylinders 34 may be used to drive a set of gears used to produce electricity.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A water purification system for producing purified water from a body of water, the water purification system comprising:
    a floating platform having a ramp extending from an edge thereof at a downward angle into the body of water;
    a primary impoundment area extending from a top portion of the ramp onto the floating platform;
    a pair of sub-impoundment areas attached to an end of the primary impoundment area distal from the ramp, each of the sub-impoundment areas comprising a container with a buoyancy block positioned therein and an associated hydraulic cylinder;
    at least one hydraulic accumulator attached to the sub-impoundment areas; and
    a nanofiltration system operatively attached to the at least one hydraulic accumulator,
    wherein water is configured to flow from the body of water onto the ramp and through the system, exiting the nanofiltration system as purified water.

2. The system of claim 1, wherein:
    the ramp comprises a pair of parabolic wave focusers lining outer edges thereof; and
    the ramp and the wave focusers are configured to work in tandem to elevate a wave in the water to maximize recovery of kinetic energy contained in the wave driving the wave to a higher elevation on the floating platform.

3. The system of claim 1, further comprising at least one ballast tank attached to a bottom surface of the ramp, wherein the at least one ballast tank is configured to reconfigure a pitch and an angle of the ramp to match conditions in the body of water.

4. The system of claim 1, further comprising an over-topping gate positioned at an end of the ramp distal from the body of water, separating the ramp from the primary impoundment area,
    wherein when water comes up the ramp, the water crashes into the over-topping gate pushing the over-topping gate into the primary impoundment area, allowing water to flow into the primary impoundment area.

5. The system of claim 4, wherein at least one gate float is attached to a surface of the gate facing inwardly towards the primary impoundment area, such that when water flows into the primary impoundment area, the water causes the gate float to lift the gate back up to a level of the water in the primary impoundment area, preventing the water from escaping back down the ramp.

6. The system of claim 1, wherein the primary impoundment area comprises at least one screen configured to prevent aquatic life from entering the system.

7. The system of claim 1, wherein:
    each buoyancy block is attached to a cylinder shaft that extends downward into the associated hydraulic cylinder having a cylinder outlet feed pipe that attaches the hydraulic cylinder to the hydraulic accumulator; and
    displacement of each buoyancy block creates pressurized water on both up and down strokes, wherein the inflow and outward flow of water provides a steady force inside of the hydraulic cylinders.

8. The system of claim 1, wherein the hydraulic accumulator is fitted with at least one pressure regulator valve, such that water in the hydraulic accumulator is maintained at a constant pressure.

9. The system of claim 1, wherein the nanofiltration system comprises a reverse osmosis nanofiltration system.

10. The system of claim 1, wherein the floating platform is a sea-going barge.

* * * * *